United States Patent [19]

Senoo

[11] 4,382,603
[45] May 10, 1983

[54] LEVEL REGULATOR FOR AN AUTOMOTIVE VEHICLE

[75] Inventor: Tetsuo Senoo, Inagi, Japan

[73] Assignee: Nissan Motor Company, Ltd., Yokohama, Japan

[21] Appl. No.: 223,843

[22] Filed: Jan. 9, 1981

[30] Foreign Application Priority Data

Jan. 16, 1980 [JP] Japan .................. 55-3389

[51] Int. Cl.³ ............................. B60S 9/00
[52] U.S. Cl. .................... 280/6 R; 267/64.28; 280/707
[58] Field of Search ............ 280/6 R, 6.1, 6.11, 280/707; 267/64.28

[56] References Cited

U.S. PATENT DOCUMENTS

| 4,017,099 | 4/1977 | Hegel ................. 280/707 |
| 4,054,295 | 10/1977 | Elliott ................ 280/6.1 |
| 4,105,216 | 8/1978 | Graham .............. 280/6 R |

FOREIGN PATENT DOCUMENTS 1261755  1/1972  United Kingdom .
1391205  4/1975  United Kingdom .

Primary Examiner—Joseph F. Peters, Jr.
Assistant Examiner—John A. Carroll
Attorney, Agent, or Firm—Schwartz, Jeffery, Schwaab, Mack, Blumenthal & Koch

[57] ABSTRACT

A level regulator for an automotive vehicle such that a supply voltage is applied to the amplifiers only while the sensors are detecting level-regulating signals, so that a wasteful current can be prevented from being passed therethrough when the vehicle is left parked with one of the wheels on the sidewalk or an uneven ground, and the battery can be protected against excessive discharge. The level regulator of the present invention comprises mechanical switches such as microswitches or reed switches as the sensors, in place of electric, photoelectric or magnetic sensors used with conventional level regulators.

9 Claims, 3 Drawing Figures

FIG. I
PRIOR ART
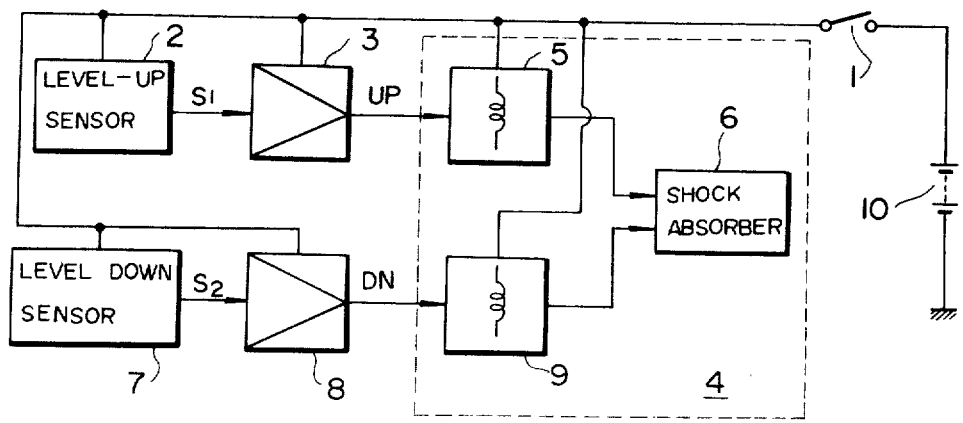
FIG.2
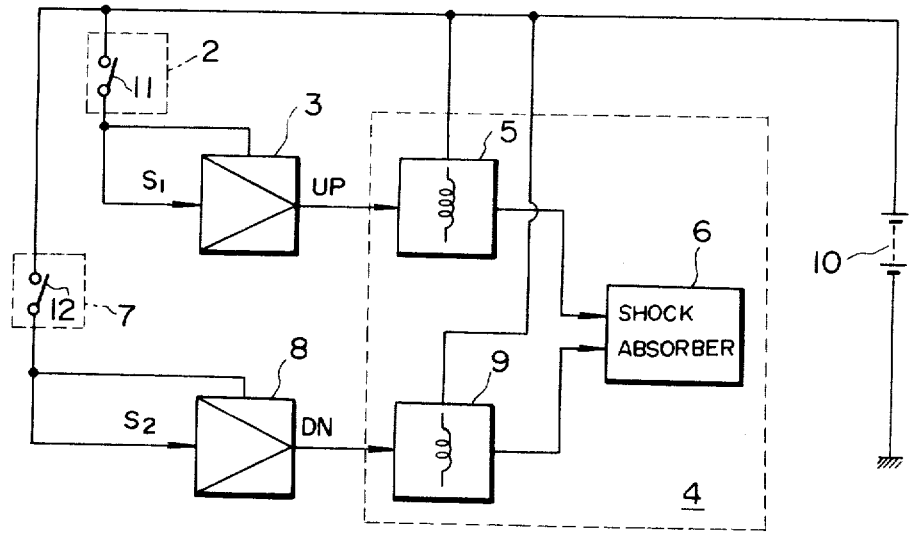

LEVEL REGULATOR FOR AN AUTOMOTIVE VEHICLE

BACKGROUND OF THE INVENTION

1. Field of the Invention

The present invention relates generally to a level regulator for an automotive vehicle and more particularly to a level regulator provided with a mechanical switch sensor to turn off the supply voltage applied to the amplifiers while the level regulator is not in operation.

2. Description of the Prior Art

As is well known, there exists a level regulator for an automotive vehicle which can automatically regulate or correct the level or height of the vehicle. This level regulator is operated when the level of the vehicle is too low because passengers or freight have been loaded into the vehicle, or too high because they have been unloaded therefrom.

In the prior-art level regulator, however, since the supply voltage is applied to the regulator only when the ignition switch is turned on, there has been a problem in that it is impossible to regulate the level of the vehicle when the ignition switch is turned off such as when the vehicle is left parked on a slope. Therefore, in this case, when the ignition switch is turned off with the vehicle fully loaded with passengers or freight, although it is possible to maintain the level as it is with the vehicle fully loaded, the level of the vehicle is necessarily increased after the vehicle has been unloaded.

On the other hand, although it is possible to apply the supply voltage to the regulator directly from the battery without providing an ignition switch therebetween, since the supply voltage is always applied thereto even when no level regulation is being performed, a leakage current inevitably continues to flow, so that the battery is discharged. A more detailed description of the prior-art level regulator will be made hereinafter with reference to FIG. 1.

SUMMARY OF THE INVENTION

With these problems in mind therefore, it is the primary object of the present invention to provide a level regulator for an automotive vehicle which can apply the supply voltage to the amplifiers only when the mechanical switches of the level sensors are kept turned on, that is when the level regulator is in operation.

To achieve the above-mentioned object, the level regulator of the present invention comprises two level sensors of mechanical switches, which can additionally function as a switching means to apply the supply voltage to the amplifiers when turned on and to cut off the supply voltage from the battery when turned off.

Therefore, the level regulator of the present invention can regulate the vehicle level at any time when necessary, regardless of the on/off position of the ignition switch, and can also prevent the battery from discharging wastefully and excessively.

BRIEF DESCRIPTION OF THE DRAWINGS

The features and advantages of the level regulator according to the present invention will be more clearly appreciated from the following description taken in conjunction with the accompanying drawings in which like reference numerals designate corresponding elements and in which:

FIG. 1 is a schematic wiring block diagram of a prior-art level regulator for an automotive vehicle;

FIG. 2 is a schematic wiring block diagram of a first embodiment of the level regulator of the present invention.

DETAILED DESCRIPTION OF THE PREFERRED EMBODIMENTS

Figure 3:
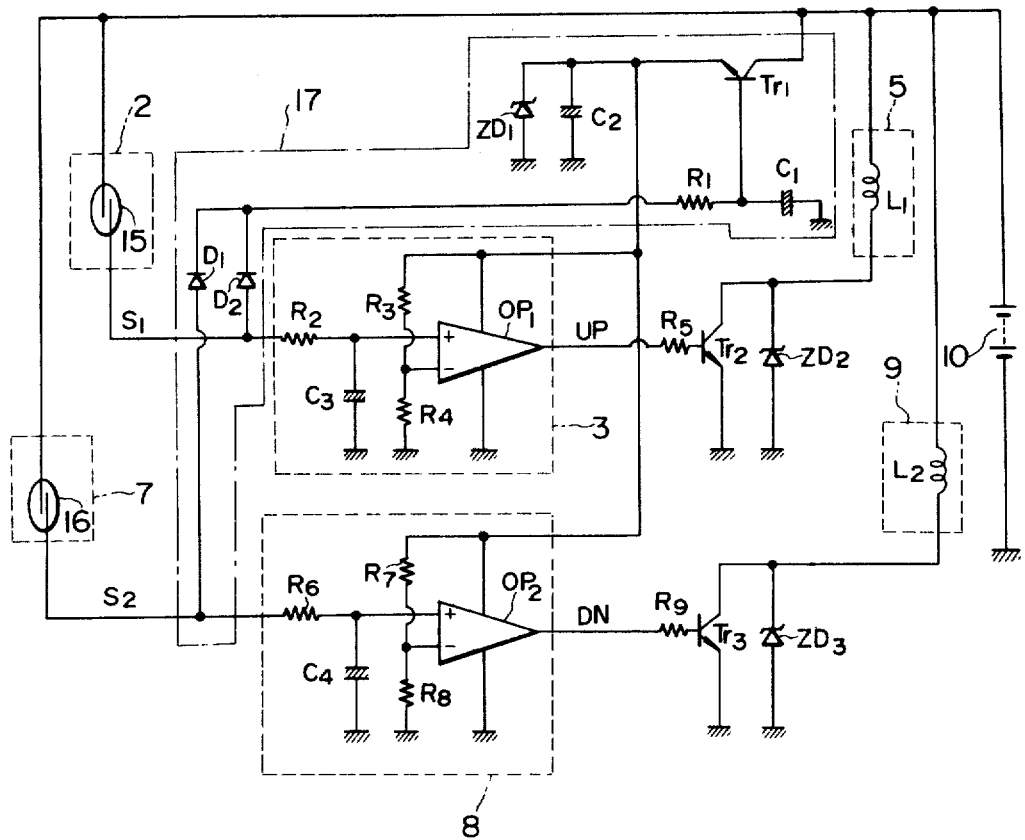
FIG. 3 is a wiring diagram of a second embodiment of the level regulator of the present invention.

To facilitate understanding of the present invention, a brief reference will be made to a prior-art level regulator for an automotive vehicle. Referring to FIG. 1, after an ignition switch 1 has been turned on, a level-up signal $S_1$ is outputted from a level-up sensor 2 when the level of the vehicle is too low because passengers or freight have been loaded into the vehicle, and next this signal $S_1$ is amplified through a level-up amplifier 3 into an UP-signal. This UP-signal energizes a compression solenoid valve 5 for injecting a gas into a shock absorber 6 to increase the level of the vehicle. When the level has been adjusted to a predetermined value, since the level-up signal $S_1$ is no longer outputted from the level-up sensor 2, the compression solenoid valve 5 is closed to maintain the level.

On the other hand, a level-down signal $S_2$ is outputted from a level-down sensor 7 when the level of the vehicle 13 is too high because passengers or freight have been unloaded from the vehicle, and next this signal $S_2$ is amplified through a level-down amplifier 8 into a DN-signal. This DN-signal energizes an exhaust solenoid valve 9 for exhausting the gas from the shock absorber 6 to decrease the level of the vehicle. When the level has been adjusted to a predetermined value, since the level-down signal $S_2$ is no longer outputted from the level-down sensor 7, the exhaust solenoid valve 9 is closed to maintain the level. In this case, the compression solenoid valve 5, the exhaust solenoid valve 9, and the shock absorber 6 together are termed a level regulating means 4.

In the prior-art level regulator described above with reference to FIG. 1, since the level regulator is so designed that the supply voltage is applied thereto only while the ignition switch 1 is kept turned on, it is impossible to regulate the level when the ignition switch is kept turned off, even if the level varies.

Therefore, in the case when the vehicle is fully loaded with passengers or freight, if the compression solenoid valve 5 and the exhaust solenoid valve 9 are of the normally-closed type of valve, the level can be maintained as it is without changing the level even if the ignition switch 1 is turned off; however, the level is inevitably increased after passengers or freight have been unloaded therefrom.

As a measure to cope with this problem, there exists a level regulator for an automotive vehicle in which the supply voltage is always applied thereto directly from the battery regardless of the on/off position of the ignition switch; however, in this case a leakage current is always flowing therefrom even when no level regulation is being performed and therefore the battery can easily be discharged wastefully. This may cause the battery 10 to be excessively discharged and there has been a problem that it could be difficult to start the engine.

In view of the above description, reference is now made to FIGS. 2 and 3, and more specifically to FIG. 2, wherein an embodiment of the level regulator of the present invention is illustrated.

In FIG. 2, the level-up sensor 2 and the level-down sensor 7 are mechanical switching means such as a microswitch 11 or 12, which are automatically turned on or off in accordance with the up- or down-motion of a mechanical means (not shown) when the level of the vehicle is below or above a predetermined value.

The level sensor switches 2 and 7 detect the level of the vehicle and apply a level-up signal $S_1$ or a level-down signal $S_2$ to a level-up amplifier 3 or a level-down amplifier 8, respectively. In addition to the above function, the level sensor switches 2 and 7 apply a supply voltage from a battery 10 to the level-up amplifier 3 and the level-down amplifier 8, respectively, the moment they are turned on. In other words, these sensor switches 2 and 7 serve to detect the level and also to apply a voltage to the amplifiers 3 and 8.

Next, a detailed description will be made of the operation of the embodiment shown in FIG. 2. When the vehicle level is normal, since the level sensors 2 and 7 are turned off, no supply voltage is applied to the amplifiers 3 and 8 from the battery 10, thus allowing saving of power consumption caused by a leakage current flowing therethrough.

When the level of the vehicle decreases because passengers or freight are loaded thereinto, the level sensor 2 is turned on; a supply voltage is applied to the amplifier 3 through the switch 11 of the sensor 2; at the same time, the level-up signal $S_1$ is inputted to the amplifier 3; the signal $S_1$ is amplified by the amplifier 3 to obtain an UP-signal. This signal actuates a compression solenoid valve 5 to inject a gas into a shock absorber 6, thereby increasing the level of the vehicle.

When the level is restored to a predetermined value, since no level-up signal $S_1$ is outputted from the level sensor 2, no UP-signal is outputted from the amplifier 3 and the compression solenoid 5 is closed, maintaining the level of the vehicle.

On the other hand, when the level of the vehicle becomes higher because passengers or freight are unloaded therefrom, the level sensor 7 is turned on; a supply voltage is applied to the amplifier 8 through the switch 12 of the sensor 7; at the same time, the level-down signal $S_2$ is inputted to the amplifier 8; the signal $S_2$ is amplified by the amplifier 8 to obtain a DN signal. This signal actuates an exhaust solenoid valve 9 to exhaust the gas from the shock absorber 6, thereby decreasing the level of the vehicle.

When the level is restored to a predetermined value, since no level-down signal $S_2$ is outputted from the level sensor 7, no DN signal is outputted from the amplifier 9 and the exhaust solenoid 9 is closed, maintaining the level of the vehicle.

As described-above, according to the present invention; since the level regulation is performed with the supply voltage being applied to the amplifiers only when the vehicle level must be regulated, it is possible to make an economical automatic level regulation.

With reference to FIG. 3, a second embodiment of the present invention will be described hereinbelow.

In this embodiment, a power supply controller 17 is additionally provided and the level-up sensor 2 and the level-down sensor 7 use mechanical switching means such as a reed switch 15 or 16, enclosed by a glass case, which are automatically turned on or off magnetically from the outside of the glass case (because the reeds are made of a magnetic material) in accordance with the up-and down-motion of a magnetic means (not shown) when the level of the vehicle is below or above a predetermined value. In this embodiment, it is, of course, possible to turn on or off the reed switches electromagnetically from outside the glass case.

When either of the reed switches 15 and 16 is turned on, either of the level signals $S_1$ and $S_2$ is generated and is applied to the base of a transistor Tr1 through either of the diodes $D_1$ or $D_2$ and a resistor $R_1$ to turn on the transistor Tr1. In this embodiment, since a condenser $C_1$ is connected between the base of the transistor Tr1 and ground, the transistor Tr1 is not turned on the moment the level signal $S_1$ is applied thereto. However, when the base voltage rises gradually and exceeds a fixed potential (the threshold voltage of Tr1) in accordance with the time constant $C_1R_1$, the transistor Tr1 is turned on, so that a supply voltage is applied to the amplifiers 3 and 8 of comparator type such as an operational amplifer through the transistor Tr1 from the battery 10. The reason a time constant circuit of $C_1R_1$ is provided at the base of the transistor Tr1 is to prevent error operations caused by chattering or vibration (on-off operations of the switch) of the reed switches 15 and 16 while the vehicle is travelling. Further, in this embodiment, a condenser $C_2$ and a Zener diode $ZD_1$ are provided at the emitter of the transistor Tr1 so as to obtain a constant potential applied to comparators $OP_1$ and $OP_2$ used as the amplifiers 3 and 8.

Next, a detailed description will be made hereinbelow of the amplifiers 3 and 8. In FIG. 3, the comparator $OP_1$ of an operational amplifier compares a reference voltage divided by two resistors $R_3$ and $R_4$ with a sensor signal voltage $S_1$ developed across a condenser $C_3$; the comparator $OP_2$ of another operational amplifier compares a reference voltage divided by two resistors $R_7$ and $R_8$ with a sensor signal voltage $S_2$ developed across a condenser $C_4$. When the sensor signal voltage $S_1$ or $S_2$, charging up the condenser $C_3$ or $C_4$ by the current from the battery 10, exceeds the reference voltage, the comparator $OP_1$ or $OP_2$ outputs an UP signal or DN signal. Further, in this embodiment, the condensers $C_3$ and $C_4$ are also provided at the inputs of the comparator $OP_1$ and $OP_2$ respectively in cooperation with the resistors $R_2$ and $R_6$ so as to prevent error operations caused by chattering or vibration of the reed switches 15 and 16, in the same way as described for the condenser $C_1$ and the resister $R_1$.

When the UP signal or DN signal is outputted, the signal is amplified by a transistor Tr2 or Tr3 to actuate the compression solenoid valve 5 or the exhaust solenoid valve 9. Therefore, as already described, the shock absorber (not shown in FIG. 3 but shown in FIG. 2) is actuated to lift or lower the vehicle according to the injection thereinto or exhaustion therefrom of a gas.

Further, in this embodiment, Zener diodes $ZD_2$ and $ZD_3$ are connected to the collectors of the transistors Tr2 and Tr3, respectively to protect them from an excessive voltage generated from the solenoid valves 5 and 9 when these valves turned off.

As described above, according to the present invention, since a pair of mechanical switches having mechanical contact points are used for detecting the level of the vehicle and, in addition, for switching the power signal to apply a supply voltage to the amplifiers, no current is passed through the amplifiers when the sensors do not detect a change in level, and the vehicle level can be regulated only by applying the supply voltage to the amplifiers when the sensors detect a change in level, regardless of the on/off position of the ignition switch, thus preventing the battery from discharging excessively.

It will be understood by those skilled in the art that the foregoing description is in terms of preferred embodiments of the present invention wherein various changes and modifications may be made without departing from the spirit and scope of the invention, as set forth in the appended claims.

What is claimed is

1. A level regulator for an automotive vehicle which comprises:
   (a) a pair of mechanical switching means for detecting a low vehicle condition and a high vehicle condition and outputting a level-up signal $S_1$ and a level-down signal $S_2$, respectively, in response to the detected conditions;
   (b) a pair of level-up and level-down amplifiers for amplifying the level up $S_1$ and level-down $S_2$ signals outputted from said switching means to an UP signal and a DN signal, the supply voltage to said amplifiers being applied through sad switching means only when said switching means detect the high and low conditions;
   (c) a pair of compression and exhaust solenoid valves actuated by the UP and DN signals;
   (d) a shock absorber for lifting the vehicle when a gas is injected in response to the UP signal and for lowering the vehicle when the gas is exhausted in response to the DN signal,
   whereby a supply voltage is applied to said amplifiers only while said switching means detect either of the high and low conditions.

2. A level regulator for an automotive vehicle as set forth in claim 1, further comprising a power supply controller including electronic switching means for applying a supply voltage to said amplifiers only while said mechanical switching means detect either of said high and low conditions and output one of the level signals, said electric switching means being connected between a battery and said amplifiers.

3. A level regulator for an automotive vehicle as set forth in either of claims 1 or 2, wherein said pair of mechanical switching means are microswitches.

4. A level regulator for an automotive vehicle as set forth in either of claims 1 or 2, wherein said pair of mechanical switching means are reed switches.

5. A level regulator for an automotive vehicle as set forth in claim 2, wherein said electric switching means is a transistor.

6. A level regulator for an automotive vehicle as set forth in claim 5, wherein said power supply controller further comprises a condenser for preventing erroneous operations caused by the chattering or vibration of said mechanical switching means, said condenser being connected between the base of said transistor and ground.

7. A level regulator for an automotive vehicle as set forth in claim 5, wherein said power supply controller further comprises a constant voltage circuit formed with a Zener diode and another condenser, said circuit being connected between the emitter of said transistor and ground, whereby a constant voltage is applied to said amplifiers.

8. A level regulator for an automotive vehicle as set forth in claim 2, wherein said amplifiers comprise comparators for amplifying the level signals $S_1$ and $S_2$ to the UP and DN signals only when the signals $S_1$ and $S_2$ exceed a predetermined voltage.

9. A level regulator for a automotive vehicle, comprising:
   a supply voltage source;
   means for raising and lowering a vehicle;
   circuit means for causing said raising and lowering means to raise and lower a vehicle in response to level-up and level-down signals respectively, when said circuit means is connected to said supply voltage; and
   switch means including mechanically operated switches for detecting a high vehicle condition and a low vehicle condition, and applying said level-down signal and said level-up signal to said circuit means in response to said high and low conditions, respectively, and connecting said supply voltage to said circuit means only in response to either said high and low vehicle conditions wherein said supply voltage source is connected to said circuit means only through said switch means such that said supply voltage source is connected to said circuit means only in response to said high and low vehicle conditions.

* * * * *